U.S. Patent Office 3,794,631
Patented Feb. 26, 1974

3,794,631
ANTISTATIC POLYAMIDE FIBER
Rodney Lee Wells and Lamberto Crescentini, Chester, Va., assignors to Allied Chemical Corporation, Morristown, N.J.
No Drawing. Filed Dec. 4, 1972, Ser. No. 312,152
Int. Cl. C08g 41/04
U.S. Cl. 260—18 N                                         3 Claims

ABSTRACT OF THE DISCLOSURE

An improved antistatic polyamide fiber is prepared by incorporating in the fiber about 1 to 12 percent by weight of a high molecular weight propylene oxide-ethylene oxide copolymer based on ethylene diamine and about 0.5 to 8 percent by weight of a fatty acid salt having the formula:

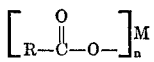

where R is an aliphatic radical containing at least 6 carbon atoms, and M is an alkali metal or alkaline earth metal, and $n$ is a whole number corresponding to the valence of the metal.

BACKGROUND OF THE INVENTION

This invention relates to a process for the melt-spinning of a filamentary structure from a synthetic polyamide polymer. More particularly, it is concerned with a process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. For example, it is disclosed in U.S. Pat. 3,475,898 to Magat and Sharkey to use poly(ethylene-propylene)ether glycols for this purpose. More recently, U.S. Pat. 3,657,386 discloses that certain propylene oxide-ethylene oxide copolymers based on ethylene diamine are especially useful in preparation of an antistatic fiber of polyamide. Although these patents represent important improvements in this art, research work has continued in an effort to find still more effective antistatic additives. Much of this research effort has been expended to develop an improved antistatic polyamide fiber which will retain its antistatic properties after many washings.

SUMMARY OF THE INVENTION

It is an object of this invention to provide a process for the formation of an improved antistatic filament, yarn or the like by melt-spinning a synthetic linear fiber-forming polyamide. Another object is to provide an improved antistatic polyamide fiber which will retain its antistatic properties after many washings of the fiber. Other objects will become apparent from the disclosure and the appended claims.

These objects are accomplished by the present invention which provides an improvement in the process for the formation of an antistatic polyamide fiber from a fiber-forming polyamide polymer containing 1 percent to 12 percent by weight based on the weight of the polyamide polymer of an antistatic tetrol compound represented by the formula:

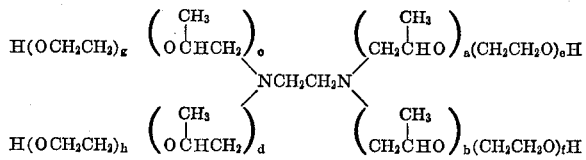

where $a$, $b$, $c$, $d$, $e$, $f$, $g$, and $h$ are each a whole number and the total of $a$, $b$, $c$, and $d$ is between 8 and 850 and the total of $e$, $f$, $g$, and $h$ is between 8 and 1,000; by extruding the molten polymer through an orifice into a quenching medium and thereafter stretching the resulting filaments, the improvement comprising dispersing in the extrudate prior to extrusion at least 0.1 percent by weight, preferably 0.5 to 8 percent, based on the weight of said polyamide polymer, of a fatty acid salt having the formula:

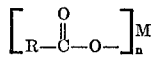

where R is an aliphatic radical containing at least 6, preferably 8 to 18 carbon atoms, and M is selected from the group consisting of alkali metals and alkaline earth metals, and $n$ is a whole number corresponding to the valence of the metal.

The present invention may be considered an improvement over the disclosure of U.S. Pat. 3,657,386 which is directed to an antistatic polyamide fiber containing tetrol compounds which are propylene oxide-ethylene oxide copolymers based on ethylene diamine. Tetrol compounds for use as the antistatic additive may be prepared as described in U.S. Pat. 2,979,528.

The fatty acid salts useful in the present invention are known compounds and some are commercially available.

The antistatic fiber of this invention may also contain conventional fiber additives such as antioxidants, stabilizers, delusterants, dyeing assists, and colorants.

DESCRIPTION OF THE PREFERRED EMBODIMENTS

The invention will now be further described in the following specific examples which are to be regarded solely as illustrative and not as restricting the scope of the invention.

The primary antistatic additives used in the examples are tetrol compounds having the general formula:

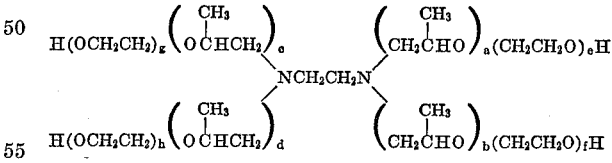

where $a$, $b$, $c$, $d$, $e$, $f$, $g$, and $h$ are each a whole number and the toal of $a$, $b$, $c$, and $d$ is between 8 and 850 and the total of $e$, $f$, $g$, and $h$ is between 8 and 1,000. Suitable tetrol compounds are commercially available (BASF-Wyandotte) under the trademark Tetronic as a series of poly(oxyethylene)-poly(oxypropylene) block copolymers having molecular weights from 1,650 to over 26,000. This series varies in length of poly(oxyethylene) chain and poly(oxypropylene) chain. A 3 and 4 digit code number indicates the molecular composition. When four digits are employed, the first two explain the average molecular weight of the hydrophobe (poly(oxypropylene) branches on the alkylene-diamine). When three digits are used only the first number serves this purpose. The last digit of each code number represents the weight percentage of hydrophilic (poly(oxyethylene)) units to the nearest 10 percent. The tetrol compounds in the examples are described this way.

Example 1

A glass reactor equipped with a heater and stirrer was charged with a mixture of 1,520 grams of ε-caprolactam and 80 grams of aminocaproic acid. The mixture was then flushed with nitrogen and was stirred and heated to 255° C. over a one-hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 4.4 grams of sodium stearate and 60 grams of the antistatic tetrol compound Tetronic 1508 (molecular weight 27,000, with ethylene oxide moiety making up 80% of the molecular weight) were added to the polycaproamide and stirring was continued to thoroughly mix the additives throughout the polymer. Nitrogen was then admitted to the glass reactor and a small pressure was maintained while the polymer was extruded from the glass reactor in the form of a polymer ribbon. The polymer ribbon was subsequently cooled, pelletized, washed and then dried. The polymer was a white solid having a relative viscosity of about 55 to 60 as determined by a concentration of 11 grams of polymer to 100 milliliters of 90 percent formic acid at 25° C. (ASTMD–789–62T).

The polycaproamide pellets containing the Tetronic 1508 and the sodium stearate were melted at about 285° C. and then melt-extruded under a pressure of about 1,500 p.s.i.g. through a 16-orifice spinnerette, each of the orifices having a diameter of 0.014 inch, to produce a 250-denier fiber. The fiber was then collected at about 1,000 feet per minute and was drawn about 3.5 times its extruded length to produce a 70-denier yarn. For convenience, this yarn hereinafter will be called Yarn A. A control yarn containing the Tetronic 1508 but no additional additives was produced in the same manner as described above. For convenience, this yarn hereinafter will be called Yarn B.

Yarn A and Yarn B were woven into conventional plain weave fabrics. The fabrics were cut into fabric test samples having a width of 3 inches and a length of 9 inches. The fabric samples were tested for their antistatic property in accordance with the general procedure described in the Technical Manual of the American Association of Textile Chemists and Colorists, 1969 edition, volume 45, at pages 206–207. This test procedure is entitled "Electrostatic Clinging of Fabrics: Fabric to Metal Test" and is numbered AATCC 115–1969. In accordance with this test, Yarn A and Yarn B both showed excellent antistatic properties; however, Yarn A was significantly improved over Yarn B. That is, the average time for Yarn A fabric samples to decling from metal completely on their own was about 55 seconds after 25 washes, whereas the average time for Yarn B fabric samples was about 130 seconds after 25 washes. Similar results were obtained when 4.4 grams of sodium oleate was substituted for the 4.4 grams of sodium stearate.

Example 2

The procedure of Example 1 was followed except that no antistatic additive was added to the polycaproamide. The average time for the yarn fabric samples to decling from metal completely was about 390 seconds after 25 washes. The textile industry presently accepts 300 seconds or less as passing.

Example 3

The procedure of Example 1 was followed except that 4.4 grams of sodium stearate (but no Tetronic 1508) was added to the polycaproamide. The average time for the yarn fabric samples to decling from metal completely was about 225 seconds after 25 washes.

Example 4

The procedure of Example 1 was followed except that 60 grams of Tetronic 1504 (molecular weight 12,500 and ethylene oxide moiety making up 40% of the molecular weight) and 3.8 grams of potassium palmitate were added to the polycaproamide. The average time for the yarn fabric samples to decling from metal completely was about 60 seconds.

Example 5

The procedure of Example 1, Yarn A, was followed except that the antistatic additives were charged with the caprolactam. The average time for the yarn fabric samples to decling from metal completely was 56 seconds.

Example 6

The procedure and additives utilized in this example were similar to Example 1, Yarn A, except that the polyamide was polymerized from poly(hexamethylene ammonium) adipate salt. The average time for the yarn fabric samples to decling from metal completely was 56 seconds.

Example 7

The procedure of Example 1 (Yarn A) was followed except that the antistatic additive of Example 1 was used together with 1.32 grams of tetra[methylene 3-(3', 5'-di-tertiary-butyl-4' - hydroxyphenyl)propionate]methane. The fiber produced had a nub count of $1.1 \times 10^3$ nubs per pound of yarn, compared to 17,000 nubs per pound without the added tetra[methylene 3-(3',5'-di-tertiary-butyl-4'-hydroxyphenyl)propionate]methane.

Example 8

The procedure of Example 1 (Yarn A) was followed except that the antistatic additive of Example 1 was used together with 0.9 gram of tetra[methylene 3-(3',5'-di-tertiary-butyl-4'-hydroxyphenyl)propionate]methane. The fiber produced had a nub count of $0.8 \times 10^3$ nubs per pound of yarn.

Example 9

Polycaproamide pellets containing the antistatic agents of Example 1, i.e., sodium stearate and Tetronic 1508, were prepared in accordance with the procedure of Example 1. The polycaproamide pellets were melted at about 285° C. and then melt extruded under pressure of 15 p.s.i.g. to a 70-orifice spinnerette, each of the orifices having a diameter of 0.018 inch to produce a 4,500 denier fiber. The fiber was collected at 1,000 feet per minute and was drawn about 4 times the extruded length to produce 1,125 denier yarn.

The yarn was textured using a steam jet and two-plied. Then, the yarn was tufted into a level loop carpet at 6.5 stitch rate, $9^{10}/_{32}$ inch pile height, mock dyed and latexed. Static buildup of the carpet was tested by a "shuffle test" measuring the electrostatic voltage build-up on a person walking with a series of short shuffling steps on a piece of carpet conditioned at 70° F. at 20% relative humidity. The voltage generated was 3.0 kv. A control carpet prepared with no antistatic additive generated 10 kv.

DISCUSSION

In additional tests, it was determined that the molecular weight of the antistatic tetrol compound is preferably between about 4,000 and about 50,000, the ethylene oxide moieties making up about 20% to about 80% of the molecular weight of said compound. Preferably, the antistatic fiber contains from about 2 percent to about 8 percent of the antistatic tetrol compound plus 0.5 to 8 percent of the instant fatty acid salt having the formula:

$$R-\overset{O}{\underset{\|}{C}}-O-M$$

where R is an aliphatic radical containing 8 to 18 carbon atoms, and M is an alkali metal. The weight ratio of the fatty acid salt to the tetrol compound is preferably between 0.02 to 0.2.

By "antistatic" fiber is meant fibers that will pass the cling test and the shuffle test as described in U.S. Pat. 3,657,386. By "fiber" is meant multifilament yarn, monofilament, and all the known physical forms of synthetic fibers. By "polyamide" is meant the polymers made by condensation of diamines with dibasic acids or by polymerization of lactams or amino acids, resulting in a synthetic resin characterized by the recurring group —CONH—. By "ethylene oxide moiety" is meant the portion of the chemical molecule —(CH₂CH₂O)—. The term "nubs" is conventionally applied and is used herein to mean enlarged sections of filaments no more than several filaments in length.

Desirably, the antistatic additives are substantially uniformly dispersed in the polyamide.

We claim:
1. An improved antistatic fiber consisting essentially of a polyamide selected from the group consisting of polyamides made by condensation of diamines with dibasic acids, and polyamides made by polymerization of lactams, resulting in a synthetic resin characterized by the recurring group —CONH—; about 1 percent to 12 percent by weight, based on the weight of the polyamide, of an antistatic tetrol compound represented by the formula:

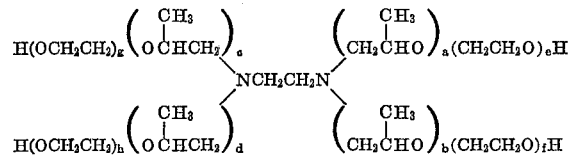

wherein a, b, c, d, e, f, g, and h are each a whole number and the total of a, b, c, and d is between 8 and 850 and the total of e, f, g, and h is between 8 and 1,000, and wherein the molecular weight of said antistatic tetrol compound is between about 4,000 and about 50,000, said ethylene oxide moieties making up about 20 percent to about 80 percent of the molecular weight of said compound; and 0.1 percent to 8 percent by weight based on the weight of the polyamide, of a fatty acid salt having the formula:

$$\left[R-\overset{O}{\underset{\|}{C}}-O-\right]_n M$$

where R is an aliphatic radical containing 8 to 18 carbon atoms, and M is selected from the group consisting of alkali metal ions and alkaline earth metal ions, and n is a whole number corresponding to the valence of the metal ion.

2. The fiber of claim 1 wherein the fatty acid salt has the formula:

$$R-\overset{O}{\underset{\|}{C}}-OM$$

where R is an aliphatic radical containing 8 to 18 carbon atoms, and M is an alkali metal ion; and the weight ratio of the fatty acid salt to the antistatic tetrol compound is between 0.02 and 0.2.

3. The fiber of claim 1 wherein the antistatic additive is used together with about 2 percent by weight of tetra-[methylene - 3 - (3',5'-di-tertiary-butyl-4'-hydroxyphenyl) propionate]methane, based on the weight of the antistatic tetrol compound, whereby the nub count of the fiber is reduced.

References Cited
UNITED STATES PATENTS

| | | | |
|---|---|---|---|
| 3,657,386 | 4/1972 | Weedon et al. | 260—857 |
| 3,658,744 | 4/1972 | Brindell et al. | 260—Dig. 19 |
| 3,161,486 | 12/1964 | Rogers et al. | 260—Dig. 19 |

DONALD E. CZAJA, Primary Examiner

E. C. RZUCIDLO, Assistant Examiner

U.S. Cl. X.R.

260—Dig. 16, Dig. 17, Dig. 19, 31.2 N, 32.4, 33.2 R, 78 S, 857 PE